Nov. 11, 1924.

R. HUMPHRIES 1,515,046

WHEEL MOUNTING AND OILING MECHANISM THEREFOR

Filed July 30, 1923

INVENTOR
Ralph Humphries
BY
ATTORNEY

Patented Nov. 11, 1924.

1,515,046

UNITED STATES PATENT OFFICE.

RALPH HUMPHRIES, OF DETROIT, MICHIGAN.

WHEEL MOUNTING AND OILING MECHANISM THEREFOR.

Application filed July 30, 1923. Serial No. 654,785.

*To all whom it may concern:*

Be it known that I, RALPH HUMPHRIES, a citizen of the Dominion of Canada, and resident of the city of Detroit, county of Wayne, and State of Michigan, have invented certain new and useful Improvements in Wheel Mountings and Oiling Mechanism Therefor, of which the following is a specification.

It is a primary object of my invention to provide a new mounting for wheels such as ordinarily used on tractors whereby a maximum speed with a minimum sized wheel may be attained. In accomplishing this result I provide an axle shaft having a gear on the end thereof adapted to mesh with an internal gear provided on the wheel. The center of the wheel is offset from the axle and journaled on a separate shaft. This arrangement may be used when doing farm work, or the like, and an ordinary wheel placed on the end of the axleshaft, to thus attain a higher speed when doing other work where speed is desirable.

I have provided a unique and highly desirable method of mounting the said second shaft and of oiling the said gear on the end of the axle shaft and internal gear on the wheel.

With these and other objects in view my invention consists in the arrangement, combination and construction of the various parts of my improved device as described in the specification claimed in my claims and shown in the accompanying drawings in which:—

Figure 1:
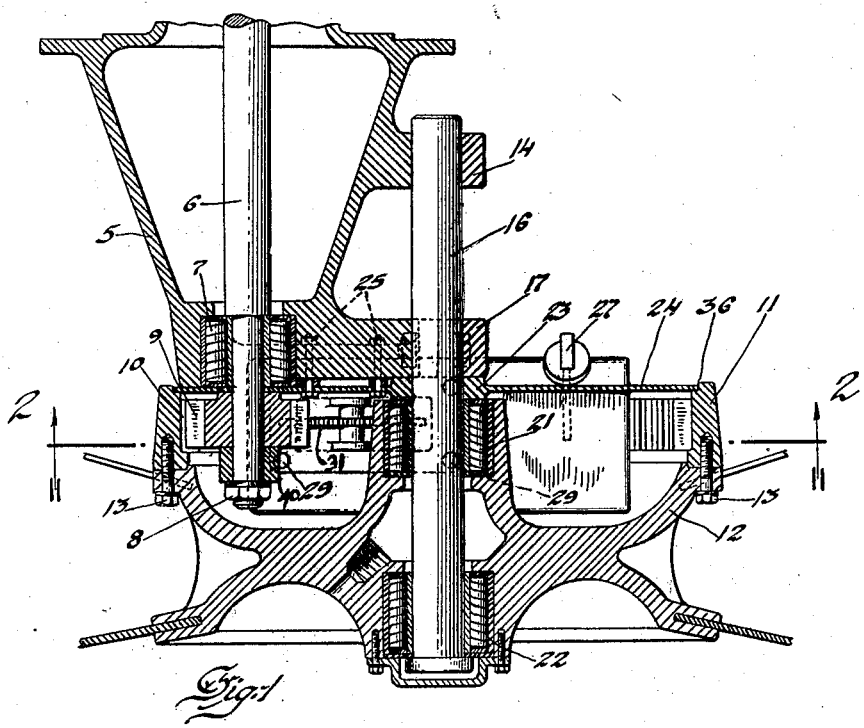
Fig. 1 is a top sectional view with certain parts broken away of my improved device.
Figure 2:
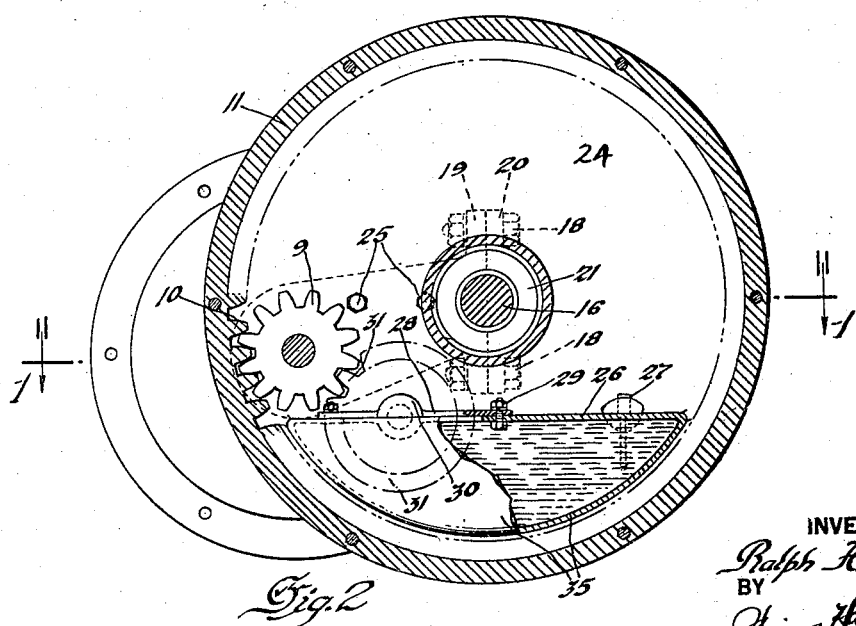
Fig. 2 is a central sectional view showing the functioning of the oiling device.

I have shown an axle housing 5 through which a driving axle 6 extends and is journaled as at 7. Secured on the end of the axle shaft 6 by means of a nut 8 and a spacer 40 is a gear adapted to mesh with an internal gear 10 provided on a ring 11 secured to a wheel 12 by means of bolts 13. The provision of the spacer 40 makes possible the positioning of a wheel directly on the end of the axle shaft, when desired, to secure a greater speed.

Depending from the axle housing 5 are a pair of integral lugs 14 and 15, which are cut away to provide a portion of a bearing for the shaft 16. The remainder of the bearing for said shaft is formed by plates 17 disposed under the lugs 14 and 15 and secured to each of them by bolts and nuts 18 extending through ears 19 on the lugs and ears 20 on the plates.

The tractor wheel 12 is journaled on the shaft 16 as at 21 and 22.

Rotation of the axle 6 and correspondingly the wheel 12 because of the engagement of the small gear 9 with the internal gear 10 on the wheel will give a slower rotation to the wheel than would be the case were the wheel journaled directly on the end of the axle shaft. This proportionately gives a greater speed to the vehicle with the smaller sized wheel when the wheel is positioned directly on the end of the axle.

Fitted around the shaft 16 is a collar 23 having an outwardly extending plate 24 adapted to shield the gears 9 and 10 from dust and dirt thrown by the tractor wheels. In order to more securely position the plate 24 against rotation I have placed a pair of bolts 25 extending through the lower, smaller portion of the lug 15 and through the plate. It will be noted that the edge of the plate 24 is positioned in a slight offset provided in the ring 11 so as to substantially seal the joint between the two as at 36. On the bottom of the plate 24 is an integrally cast tank 26 adapted to be filled with oil through the opening 27. The tank 26 is provided with an opening in the top thereof over which the plate 28 extends, said plate being bolted thereto by means of the bolt 29. The plate 28 is provided with a bearing 30 and is centrally split to accommodate a small relatively thin gear 31 which rotates in the bearing provided on the plate 28 at 30. The gear 31 is so positioned as to constantly mesh with the driving gear 9. Thus rotation of the driving gear 9 will rotate the small idler gear 31, which latter gear is constantly more or less submerged in the oil 35 provided in the tank 26 so that a small quantity of oil will be carried by the teeth of the gear 31 to the teeth of the gear 9 and thus lubricate the gear 9 as well as the internal gear 10.

I desire it to be understood that various changes may be made in the arrangement, combination and construction of the various parts of my improved device without departing from the spirit of my invention, and it is my intention to cover by my claims such changes as may be reasonably included within the scope thereof.

What I claim is:

1. In a device of the class described, an axle housing having an axle therein, lugs depending from said housing, a shaft fixed at the ends of said lugs and a wheel rotatable on said shaft, a gear on the end of said axle and an internal gear fixed to said wheel and in mesh with the gear on said axle, whereby said wheel may be rotated by the rotation of said axle, and a shield disposed adjacent said gears to protect them from dust, dirt and the like, said shield having an oil container fixed thereto with an idler gear therein meshing with said first gear and supplying oil thereto.

2. In a device of the class described, an axle shaft having a gear on the end thereof, a second shaft having a wheel rotatable thereon, said wheel having a gear connected with said first gear, an oil container having a removable top, an idler gear positioned in said top extending partially within and partially without said container and meshing with said first gear and supplying oil thereto from said container.

3. In a device of the class described, an axle housing having an axle therein, a shaft adjacent said axle, a wheel on said shaft and geared to said axle, an oil container adjacent said gears, an idler gear positioned partly within and partly without said container and meshing with one of said first gears, the opening in said container through which said gear extends being closely fitted to said idler gear so as to substantially prevent the carrying of oil from said container on the sides of said idler gear.

4. In a device of the class described, an axle housing having an axle therein, a shaft adjacent said axle having a wheel secured thereon, a gear on the said axle shaft adapted to drive and said wheel, the end of the said axle shaft extending through the said gear and having a spacer thereon, whereby said gear and said wheel may be removed and another wheel positioned directly on said axle shaft.

RALPH HUMPHRIES.